(12) United States Patent
Zhao et al.

(10) Patent No.: US 12,041,194 B2
(45) Date of Patent: Jul. 16, 2024

(54) ROTATION SHAFT MECHANISM FOR FOLDABLE SCREEN, FOLDABLE SCREEN ASSEMBLY, AND FOLDABLE MOBILE TERMINAL

(71) Applicant: HuiZhou TCL Mobile Communication Co., Ltd., Guangdong (CN)

(72) Inventors: Xiaofeng Zhao, Guangdong (CN); Yongqiu Xie, Guangdong (CN)

(73) Assignee: HuiZhou TCL Mobile Communication Co., Ltd., HuiZhou (CN)

( * ) Notice: Subject to any disclaimer, the term of this patent is extended or adjusted under 35 U.S.C. 154(b) by 304 days.

(21) Appl. No.: 17/616,695

(22) PCT Filed: Dec. 12, 2019

(86) PCT No.: PCT/CN2019/124950
§ 371 (c)(1),
(2) Date: Dec. 6, 2021

(87) PCT Pub. No.: WO2021/103161
PCT Pub. Date: Jun. 3, 2021

(65) Prior Publication Data
US 2022/0311847 A1    Sep. 29, 2022

(30) Foreign Application Priority Data

Nov. 30, 2019 (CN) .......................... 201911208824.7

(51) Int. Cl.
*H04M 1/02* (2006.01)

(52) U.S. Cl.
CPC ....... *H04M 1/0268* (2013.01); *H04M 1/0214* (2013.01)

(58) Field of Classification Search
CPC .. H04M 1/0268; H04M 1/0214; H04M 1/022; G06F 1/1652; G06F 1/1681
(Continued)

(56) References Cited

U.S. PATENT DOCUMENTS 10,423,019 B1    9/2019  Song
11,032,402 B2    6/2021  Liu et al.
(Continued)

FOREIGN PATENT DOCUMENTS

CN    105979032    9/2016
CN    108322567    7/2018
(Continued)

OTHER PUBLICATIONS

International Search Report and the Written Opinion Dated Aug. 26, 2020 From the International Searching Authority Re. Application No. PCT/KR2015009936 and Its Translation of Search Report Into English. (9 Pages).
(Continued)

*Primary Examiner* — Eugene Yun

(57) ABSTRACT

The present application provides a rotation shaft mechanism for a foldable screen, a foldable screen assembly, and a foldable mobile terminal. The present application can make the foldable screen of the foldable terminal work more reliably and smoothly. It has outstanding advantages of simpler structure, easy implementation, low cost, strong reliability, long lifespan, and more application fields, and can be widely used in foldable mobile terminals.

20 Claims, 8 Drawing Sheets

(58) Field of Classification Search
USPC .......................................................... 455/566
See application file for complete search history.

(56) References Cited

U.S. PATENT DOCUMENTS

| | | | |
|---|---|---|---|
| 2017/0123455 A1 | 5/2017 | Park et al. | |
| 2017/0272559 A1* | 9/2017 | Cavallaro | ........... H04M 1/0216 |
| 2020/0348732 A1* | 11/2020 | Kang | .................... G06F 1/1652 |

FOREIGN PATENT DOCUMENTS

| | | |
|---|---|---|
| CN | 207977991 | 10/2018 |
| KR | 2013-0120703 | 11/2013 |

OTHER PUBLICATIONS

Notification of Office Action and Search Report Dated Jul. 24, 2020 From the State Intellectual Property Office of the People's Republic of China Re. Application No. 201911208824.7 and Its Translation of Office Action Into English. (19 Pages).

Notice of Allowance Dated Jun. 25, 2021 From the State Intellectual Property Office of the People's Republic of China Re. Application No. 201911208824.7 and Its Translation of Office Action Into English. (19 Pages).

\* cited by examiner

ROTATION SHAFT MECHANISM FOR FOLDABLE SCREEN, FOLDABLE SCREEN ASSEMBLY, AND FOLDABLE MOBILE TERMINAL

RELATED APPLICATIONS

This application is a National Phase of PCT Patent Application No. PCT/CN2019/124950 having International filing date of Dec. 12, 2019, which claims the benefit of priority of Chinese Patent Application No. 201911208824.7 filed on Nov. 30, 2019. The contents of the above applications are all incorporated by reference as if fully set forth herein in their entirety.

FIELD AND BACKGROUND OF THE INVENTION

The present application relates to the technical field of foldable screen application design, and particularly to a rotation shaft mechanism for a foldable screen, a foldable screen assembly, and a foldable mobile terminal.

With continuous development of portable electronic devices, display screens of mobile terminals such as mobile phones and tablet computers have become larger and larger. Although large screens can display more content for users at a same time, they have also brought problems such as large size of electronic devices, large space occupation, and poor portability, thereby restricting development of large-screen portable electronic devices. In order to take into account dual attributes of portability of various electronic devices and large screens, foldable screen electronic products have emerged.

2019 is the first year of the launch of foldable screen products. Mobile phone manufacturers such as Samsung, Huawei, Xiaomi, OPPO, and others have launched mobile terminal products in the form of foldable screens. Among them, the Samsung Galaxy folder adopts an internal folding solution and provided the first batch of test machines in May, but test users have reported that there are still many problems with the machine, mainly related to problems encountered during a bending process of the foldable screen. These problems are also reflected in most foldable mobile devices. For example, the screen is easily damaged at a bending site, the screen does not slide smoothly and other issues, and wrinkle problems due to unsmooth sliding of the screen. The above-mentioned problems bring poor experiences of the existing foldable screen to users during a bending process and have become main issues in a design of foldable mobile terminals.

Therefore, how to effectively solve problems of easy damage to the screen at the bending position of the foldable mobile terminals and unsmooth sliding of screens to improve user experience of foldable screen mobile terminals have become a technical problem that needs to be solved urgently and a focus of research by those skilled in the art.

SUMMARY OF THE INVENTION

The present application relates to the technical field of foldable screen application design, and particularly to a rotation shaft mechanism for a foldable screen, a foldable screen assembly, and a foldable mobile terminal.

For effectively solving the problems of easy damage to the screen at the bending position of the foldable mobile terminals and unsmooth sliding of screens, the present application provides a rotation shaft mechanism for a foldable screen, a foldable screen assembly, and a foldable mobile terminal which can reduce the possibility of screen wear at the bending and make the foldable screen of the foldable mobile terminal slide more smoothly, effectively solving the layering problem caused by foldable screen wrinkles, significantly improving the user experience, and completely solving many problems with technology in the current situation.

In order to achieve the above technical purposes, the present application provides a rotation shaft mechanism for a foldable screen, comprising a left arm and a right arm that are symmetrically arranged, wherein: the left arm is configured to secure a left support of a foldable mobile terminal, and the right arm is configured to secure a right support of the foldable mobile terminal; one end of the left arm is fixed with a left rotation shaft and one end of the right arm is fixed with a right rotation shaft that is symmetrically arranged with the left rotation shaft; the left rotation shaft is connected with a left cam, the right rotation shaft is connected with a right cam, the left cam and the right cam are both arranged on one side of first limiting plate, and a second limiting plate is arranged on the other side of the first limiting plate; a left gear, a right gear, and a transmission gear are arranged between the first limiting plate and the second limiting plate; one end of a central fixed shaft of the left gear penetrates into a first left limiting hole of the first limiting plate and is drivingly connected with the left cam, the other end of the central fixed shaft of the left gear penetrates into a second left limiting hole of the second limiting plate; one end of a central fixed shaft of the right gear penetrates into a first right limiting hole of the first limiting plate and is drivingly connected with the right cam, the other end of the central fixed shaft of the right gear penetrates into a second right limiting hole of the second limiting plate; and at least one transmission gear is drivingly connected between the left gear and the right gear, and two ends of a central fixed shaft of the transmission gear respectively penetrate into a first middle limiting hole of the first limiting plate and a second middle limiting hole of the second limiting plate.

Furthermore, a left fan-shaped sliding slot is formed in an inner surface of the left arm, a left connecting rod is provided in the left fan-shaped sliding slot, a left central shaft is fixed to a circle center of the left fan-shaped sliding slot, the left central shaft is rotatably connected to one end of the left connecting rod, and the other end of the left connecting rod is rotatably connected to a left swing shaft, and the left swing shaft is rotatably connected to a left side of a left lifting plate of the foldable mobile terminal; a right fan-shaped sliding slot is formed in an inner surface of the right arm, a right connecting rod is provided in the right fan-shaped sliding slot, a right central shaft is fixed to a circle center of the right fan-shaped sliding slot, the right central shaft is rotatably connected to one end of the right connecting rod, the other end of the right connecting rod is rotatably connected with a right swing shaft, and the right swing shaft is rotatably connected with a right side of a right lifting plate of the foldable mobile terminal; and the left lifting and right lifting plates are both arranged on a back of the foldable screen.

Furthermore, an anchor block is provided at a middle of a bracket of the foldable mobile terminal, the second limiting plate is fixed to the anchor block, a left hinge and a right hinge are respectively fixed on both sides of the anchor block, a right side of the left lifting plate of the foldable mobile terminal is hinged to the anchor block through the left hinge, and a left side of the right lifting plate of the foldable mobile terminal is hinged to the anchor block through the right hinge; and a left containment hole corresponding to the second left limiting hole and a right containment hole corresponding to the second right limiting hole are formed on the anchor block, the other end of the central fixed shaft of the left gear sequentially penetrates the second left limiting hole and the left containment hole, the other end of the central fixed shaft of the right gear sequentially penetrates the second right limiting hole and the right containment hole.

Furthermore, the left cam and the right cam are symmetrically arranged and have same structures, both comprising a first cam and a second cam that are secured to each other and arranged in an offset manner; and the two first cams are respectively connected to the left rotation shaft and the right rotation shaft; and the two second cams are respectively connected to the central fixed shaft of the left gear and the central fixed shaft of the right gear.

In order to achieve the above technical purposes, the present application further provides a foldable screen assembly comprising any rotation shaft mechanism for foldable screens disclosed above.

Furthermore, the foldable screen assembly further comprises a slide rail mechanism comprising a steel sheet, a sliding part and a guide part, the sliding part is fixed on the steel sheet, the guide part is fixed on the bracket of the foldable mobile terminal, the sliding part cooperates with the guide part and slides along the guide part, and the steel sheet is configured to fix a foldable screen of the foldable mobile terminal.

Further, the sliding part is a bending piece extending from an edge of the steel sheet, and a strip hole is formed in the bending piece; and the guide part comprises a support block and a limiting member, the support block is fixed on the bracket of the foldable mobile terminal, the limiting member is fixed on a side of the support block, a rod portion of the limiting member passes through the strip hole and its end is secured to the support block, the strip hole is located between a head portion of the limiting member and the support block, and a diameter of the head portion of the limiting member is greater than a width of the strip hole.

Furthermore, the foldable screen assembly further comprises a booster mechanism, and the booster mechanism comprises: a spring, and the spring is in a compressed state under an action of a pulling force of the foldable screen fixed on the steel sheet when the foldable screen of the foldable mobile terminal is in an unfolded state; and the spring releases a thrust that pushes the foldable screen to slide to both sides when the foldable screen of the foldable mobile terminal is restored to a folded state.

Furthermore, the spring is a compression spring, the compression spring is arranged in a cylindrical housing with one end closed, the cylindrical housing is fixed on the bracket of the foldable mobile terminal, the compression spring is connected to a head portion of the push rod in the cylindrical housing, an end of a rod part of the push rod protrudes from the cylindrical housing and abuts on the steel sheet, and a diameter of a head portion of the push rod is greater than a diameter of an opening of the cylindrical housing.

In order to achieve the above technical purposes, the present application further provides a foldable mobile terminal comprising any foldable screen assembly disclosed above or any rotation shaft mechanism for foldable screens disclosed above.

Further, the foldable mobile terminals may be a portable electronic product with a foldable screen, such as a smart phone, a smart watch, a smart bracelet, a tablet computer, a notebook computer, or a smart wearable device (such as a smart helmet and smart glasses).

When the foldable screen of the foldable mobile terminal is fully folded, the present application can hide the extra part of the foldable screen in the space formed by sinking of the lifting plate, which better prevents friction or resistance to the bending screen made by other structures (such as brackets, or components of the rotating shaft).

Compared with the prior art, the present application provides a brand new screen sliding solution. Under the action of the slide rail mechanism and the booster mechanism, the solution can better work with the foldable screen and ensure that the screen is unfolded or fully folded. In the process, it slides on the top of the case very smoothly without affecting the screen display effect at all, which can meet the folding needs of foldable mobile terminals in different forms, significantly improve the user experience, and better solve the existing foldable mobile terminals and problems such as proneness to jamming and unsmooth sliding.

The present application has the outstanding advantages of simple structure, easy implementation, low cost, strong reliability, long life, and wide application range, and can be directly applied to foldable mobile terminals.

BRIEF DESCRIPTION OF THE SEVERAL VIEWS OF THE DRAWINGS

In order to more clearly illustrate technical solutions in embodiments of the present disclosure, a brief description of accompanying drawings used in a description of the embodiments will be given below. Obviously, the accompanying drawings in the following description are merely some embodiments of the present disclosure. For those skilled in the art, other drawings may be obtained from these accompanying drawings without creative labor.

DESCRIPTION OF SPECIFIC EMBODIMENTS OF THE INVENTION

Figure 1:
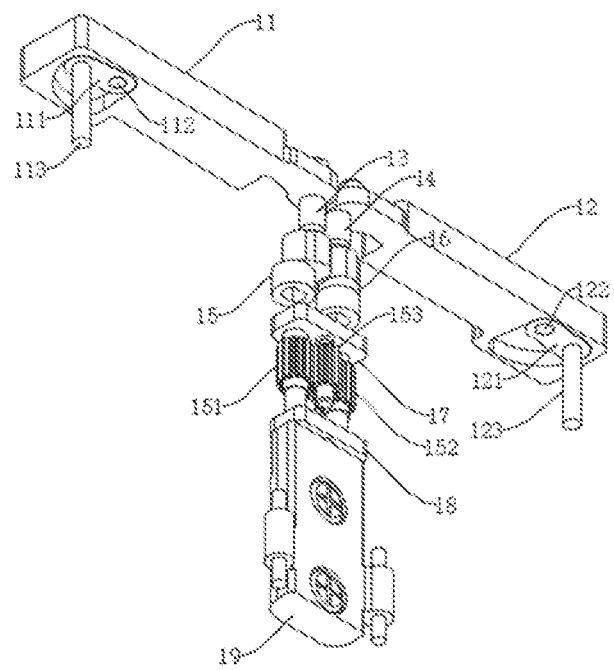
FIG. 1 is an exploded structural diagram of an embodiment of a rotation shaft mechanism for a foldable screen provided by the present application.

Technical solutions in embodiments of the present disclosure are clearly and completely described below in conjunction with accompanying drawings. It is apparent that the described embodiments are merely a part of the embodiments of the present disclosure and not all embodiments. All other embodiments obtained by those skilled in the art based on the embodiments of the present disclosure without creative labor are within the claimed scope of the present disclosure. In a case of no conflict, the following embodiments and their technical features can be combined with each other.

In the description of the present disclosure, it should be understood that location or position relationships indicated by terms, such as "center", "longitudinal", "transverse", "length", "width", "thickness", "up", "down", "front", "rear", "left", "right", "vertical", "horizontal", "top", "bottom", "inside", and "outside" are location or position relationships based on illustration of the accompanying drawings, are merely used for describing the present disclosure and simplifying the description instead of indicating or implying the indicated apparatuses or elements should have specified locations or be constructed and operated according to specified locations, and thereof, should not be intercepted as limitations to the present disclosure. Furthermore, structural elements with same or similar characteristics may be indicated by same or different reference numerals in the present disclosure. In addition, terms such as "first" and "second" are used merely for description, but shall not be construed as indicating or implying relative importance or implicitly indicating a number of the indicated technical feature. Hence, the feature defined with "first" and "second" may explicitly or implicitly includes one or more such features. In the description of the present disclosure, a term "a plurality of" means "two or more" unless otherwise specifically limited.

In the present application, unless otherwise clearly specified and limited, the terms "installed", "connected", "connected", "fixed" and other terms should be understood in a broad sense, for example, it can be a fixed connection or a detachable connection, Or integrated; it can be mechanically connected or electrically connected; it can be directly connected or indirectly connected through an intermediary, it can be the internal communication of two components or the interaction relationship between two components, unless otherwise specified The limit. For those of ordinary skill in the art, the specific meanings of the above-mentioned terms in the present application can be understood according to specific circumstances.

In the present application, the word "exemplary" is used to mean "serving as an example, illustration, or illustration". Any embodiment described as "exemplary" in the present application is not necessarily construed as being more preferred or advantageous over other embodiments. In order to enable any person skilled in the art to implement and use the present application, the following description is given. In the following description, the present application lists details for the purpose of explanation. It should be understood that those of ordinary skill in the art can realize that the present application can be implemented even without using these specific details. In other instances, well-known structures and processes will not be elaborated in detail to prevent unnecessary details to obscure the description of the present application. Therefore, the present application is not intended to be limited to the illustrated embodiments, but should be consistent with the widest scope that conforms to the principles and features disclosed in the present application.

Figure 2:
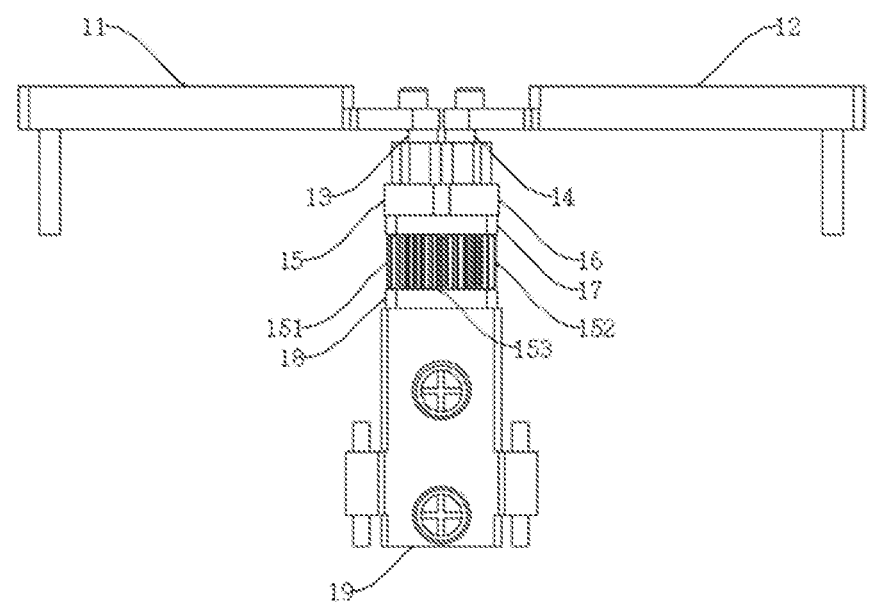
FIG. 2 is a schematic diagram of a front structure of an embodiment of the rotation shaft mechanism for the foldable screen provided by the present application.
Figure 3:
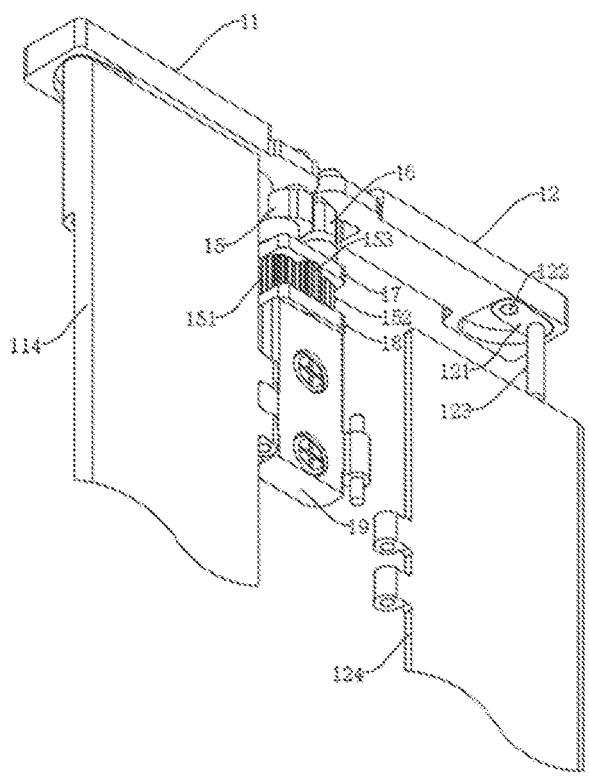
FIG. 3 is a schematic diagram of a three-dimensional structure of an embodiment of the rotation shaft mechanism for the foldable screen provided by the present application.
Figure 4:
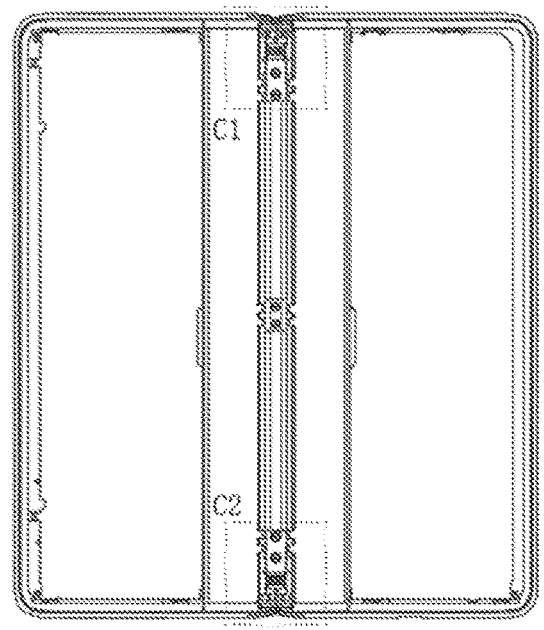
FIG. 4 is a schematic diagram of an arrangement layout of two rotation shaft mechanisms for the foldable screen on a bracket of a foldable mobile terminal.

Please refer to FIG. 1. FIG. 1 is an exploded structure diagram of an embodiment of a rotation shaft mechanism for a foldable screen provided in the present application. The foldable screen in the present application can be understood as a kind of flexible screen. Specifically, the present embodiment provides a rotation shaft mechanism for a foldable screen. Both the top and bottom of a foldable mobile terminal can each be provided with a rotation shaft mechanism, and this two rotation shaft mechanisms need to move synchronously and be arranged symmetrically. A bracket 26 of the foldable mobile terminal comprises a left bracket of the foldable mobile terminal and a right bracket of the foldable mobile terminal. A steel sheet is arranged on the left bracket and a steel sheet is arranged on the right bracket. The foldable screen assembly may also comprise an improved rotation shaft mechanism, which can not only provide storage space for a folding position of a folded foldable screen and improve the bending performance of the foldable screen, but also can be used to better open or close the foldable screen, and make the screen unfolding or closing process smoother, Thereby improving user experience. As shown in FIGS. 1, 2, and 3, the rotation shaft mechanism comprises a left arm 11 and a right arm 12 that are symmetrically arranged. The left arm 11 is configured to secure a left support of a foldable mobile terminal, and the right arm 12 is configured to secure a right support of the foldable mobile terminal; and one end of the left arm 11 is fixed with a left rotation shaft 13 and one end of the right arm 12 is fixed with a right rotation shaft 14 that is symmetrically arranged with the left rotation shaft 13. In the present embodiment, the left rotation shaft 13 is secured to a left cam 15, and/or the right rotation shaft 14 is secured to a right cam 16. At least one rotation shaft is secured to one cam, and the other rotation shaft can be secured to or rotationally connected to ensure that these arms move synchronously during the process of unfolding or folding the foldable screen. The left cam 15 and the right cam 16 are both arranged on one side of a first limiting plate 17, and a second limiting plate 18 is arranged on the other side of the first limiting plate 17. A left gear 151, a right gear 152, and a transmission gear 153 are arranged between the first limiting plate 17 and the second limiting plate 18. One end of a central fixed shaft of the left gear 151 penetrates into a first left limiting hole of the first limiting plate 17 and is drivingly connected with the left cam 15, and the other end of the central fixed shaft of the left gear 151 penetrates into a second left limiting hole of the second limiting plate 18. One end of a central fixed shaft of the right gear 152 penetrates into a first right limiting hole of the first limiting plate 17 and is drivingly connected with the right cam 16, and the other end of the central fixed shaft of the right gear 152 penetrates into a second right limiting hole of the second limiting plate 18. At least one transmission gear 153 is drivingly connected between the left gear 151 and the right gear 152. In this embodiment, each shaft mechanism has two transmission gears, which are used to ensure that the four arms rotate synchronously when an user unfolds or folds the foldable screen, that is, after at least one arm drives the rotation shaft to move, the rotation shaft drives the cam to move, the cam drives the gear on one side, the gear on one side drives the transmission gear, and the arm on the other side can act as the active moving part under the drive of the bracket connected to it, or the power transmitted from the aforementioned arm on the other side. Herein, two ends of a central fixed shaft of the transmission gear 153 respectively penetrate into a first middle limiting hole of the first limiting plate 17 and a second middle limiting hole of the second limiting plate 18. As shown in FIG. 4, in this embodiment, two symmetrically arranged rotating shaft mechanisms are arranged on the bracket of the mobile terminal, specifically are shown at positions C1 and C2 in FIG. 4.

As shown in FIG. 1, a left fan-shaped sliding slot is formed in an inner surface of the left arm 11, a left connecting rod 111 used to rotate according to unfolding or folding of the foldable screen is provided in the left fan-shaped sliding slot, a left central shaft 112 is fixed to a circle center of the left fan-shaped sliding slot, the left central shaft 112 is rotatably connected to one end of the left connecting rod 111, and the other end of the left connecting rod 111 is rotatably connected to a left swing shaft 113, and the left swing shaft 113 is rotatably connected to a left side of a left lifting plate 114 of the foldable mobile terminal. As shown in FIGS. 1 and 3, a right fan-shaped sliding slot is formed in an inner surface of the right arm 12, a right connecting rod 121 used to rotate according to unfolding or folding of the foldable screen is provided in the right fan-shaped sliding slot, a right central shaft 122 is fixed to a circle center of the right fan-shaped sliding slot, the right central shaft 122 is rotatably connected to one end of the right connecting rod 121, the other end of the right connecting rod 121 is rotatably connected with a right swing shaft 123, and the right swing shaft 123 is rotatably connected with a right side of a right lifting plate 124 of the foldable mobile terminal. The left lifting and right lifting plates are both arranged on the back of the foldable screen. Based on the above-mentioned rotation shaft mechanism of the foldable screen assembly, the left lifting plate 114 and the right lifting plate 124 can be raised and lowered along a direction perpendicular to the screen as the foldable screen is unfolded or folded. Specifically, the left lifting plate 114 and the right lifting plate 124 are far away from the foldable screen (that is, "upward") when the foldable screen is folded. The left lifting plate 114 and the right lifting plate 124 are close to the foldable screen (that is, "downward") when the foldable screen is unfolded so that sliding of the foldable screen is more smooth during unfolding or folding. FIG. 3 is a schematic diagram of the state of the left lifting plate 114 and the right lifting plate 124 when the foldable screen is unfolded. In order to make both sides of the lifting plates rise and fall synchronously, the left cam 15 and the right cam 16 of this embodiment are symmetrically arranged and have same structures, both comprising a first cam and a second cam that are secured to each other and arranged in an offset manner. The two first cams are respectively connected to the left rotation shaft 13 and the right rotation shaft 14, and the two second cams are respectively connected to the central fixed shaft of the left gear 151 and the central fixed shaft of the right gear 152. Based on the same purpose (to make both sides of the lifting plates rise and lower synchronously), one end surface of the left arm 11 is fixed with a left rotation shaft 13 and the other end surface is fixed with a left support shaft corresponding to the left rotation shaft 13 but with a different axis. One end surface of the support arm 12 is fixed with the right rotation shaft 14 and the other end surface is fixed with a right support shaft corresponding to the right rotation shaft 14 but with a different axis. The left support shaft and the right support shaft (not marked) above the rotation shaft in the figures are both used to rotationally connect with the bracket. A cross-section of the foldable screen in a folded state can also be in a "wafer-drop" shape by setting the upper and lower shafts with different shaft centers. As shown in FIG. 3, in order to more clearly illustrate the product structure of this embodiment, the left lifting plate 114 on the left half in FIG. 3 is connected with the left arm 11 and the right lifting plate 124 on the right half is not connected with the right arm 12. An anchor block 19 is provided at a middle of the bracket 26 of the foldable mobile terminal, the second limiting plate 18 is fixed to the anchor block 19, a left hinge and a right hinge are respectively fixed on both sides of the anchor block 19, a right side of the left lifting plate 114 of the foldable mobile terminal is hinged to the anchor block 19 through the left hinge, and a left side of the right lifting plate 124 of the foldable mobile terminal is hinged to the anchor block 19 through the right hinge. A left containment hole corresponding to the second left limiting hole and a right containment hole corresponding to the second right limiting hole are formed on the anchor block 19, the other end of the central fixed shaft of the left gear 151 sequentially penetrates the second left limiting hole and the left containment hole, the other end of the central fixed shaft of the right gear 152 sequentially penetrates the second right limiting hole and the right containment hole. Under the action of the foldable screen assembly provided in the present application, through cooperation of the slide rail mechanism, the booster mechanism, and the rotating shaft mechanism, the screen is unfolded by 180° when a case of the foldable mobile terminal is opened. A surplus part of the foldable screen after being folded is hidden in the space formed by the movement of the hinge mechanism (that is, the space formed by the sinking of the lifting plate) when the foldable mobile terminal case is closed, which prevents friction or resistance of other structures (such as brackets, shaft-related parts, etc.) to the screen at the bending place, thereby improving the bending performance of the foldable screen, making the cross section of the foldable screen to be bent in a "water-drop" shape, which can better meet different folding demands (especially inward folding) of the current mobile phones with foldable screens.

The present application also provides a foldable screen assembly, as shown in FIGS. 1 to 16. The foldable screen assembly comprises any one of the above embodiments of the rotation shaft mechanism for the foldable screens, and the foldable screen assembly also comprises a slide rail mechanism and a booster mechanism.

Figure 5:
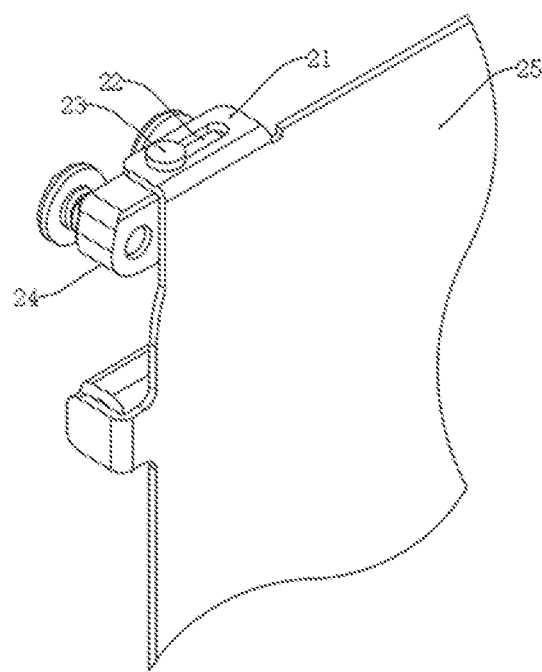
FIG. 5 is a schematic diagram of a three-dimensional structure of an embodiment of a slide rail mechanism for the foldable screen provided by the present application.
Figure 6:
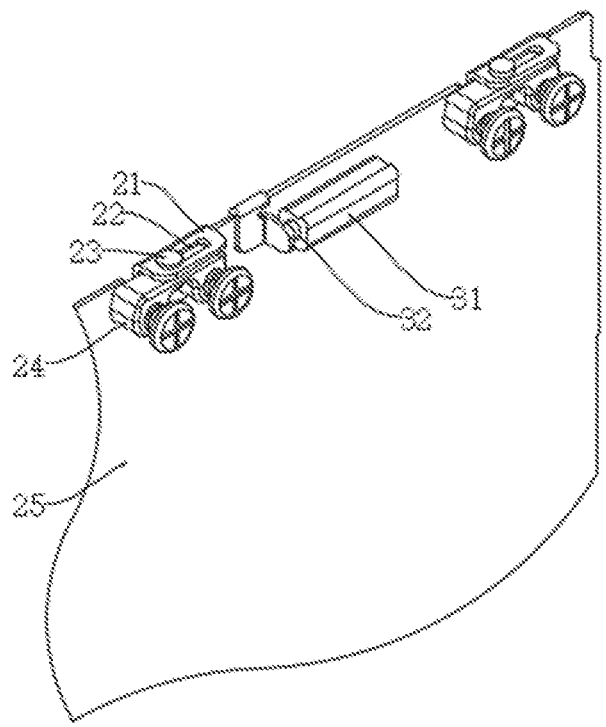
FIG. 6 is a schematic diagram of an arrangement layout of the slide rail mechanism and a booster mechanism provided by the present application.

In some embodiments, the slide rail mechanism comprises a sliding part and a guide part 27, and is able to achieve a better sliding effect of the foldable screen. As shown in FIGS. 5-6, the sliding part is a bending piece 21 extending from an edge of the steel sheet 25, and a strip hole 22 is formed in the bending piece 21. The guide part 27 comprises a support block 24 and a limiting member 23, the support block 24 is fixed on the bracket 26 (i.e. the case) of the foldable mobile terminal. The limiting member 23 is fixed on a side of the support block 24, and the limiting member 23 may be a screw-shape, which includes a head portion and a rod portion. The rod portion of the limiting member 23 passes through the strip hole 22 and its end is secured to the support block 24, the strip hole 22 is located between a head portion of the limiting member 23 and the support block 24, and a diameter of the head portion of the limiting member 23 is greater than a width of the strip hole 22. In this embodiment, eight slide rail mechanisms can also be arranged to achieve a better screen sliding effect.

Figure 8:
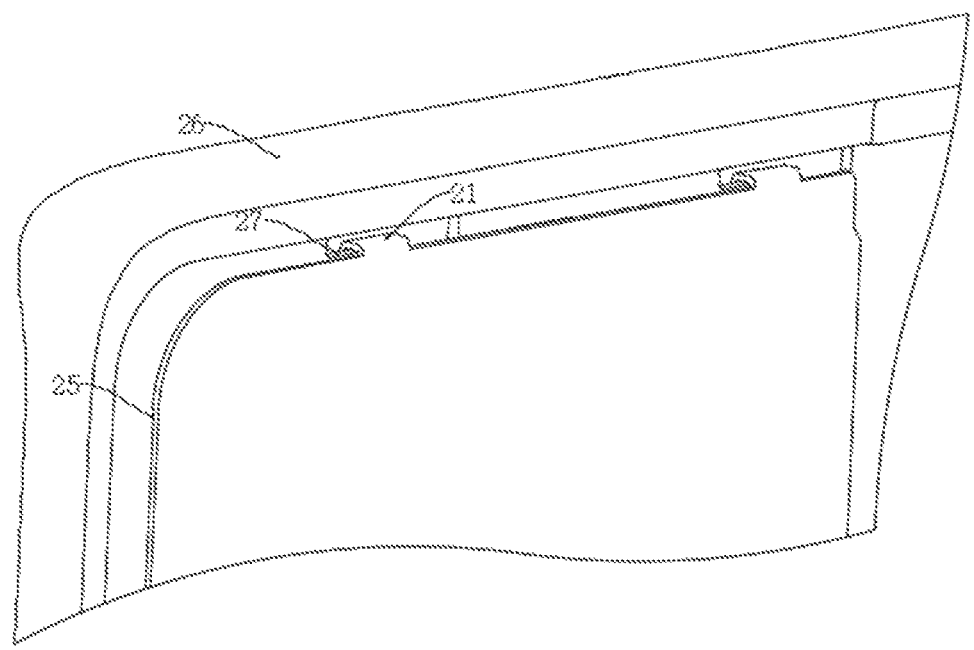
FIG. 8 is a schematic diagram of a three-dimensional structure of another embodiment of the slide rail mechanism for the foldable screen provided by the present application.
Figure 9:
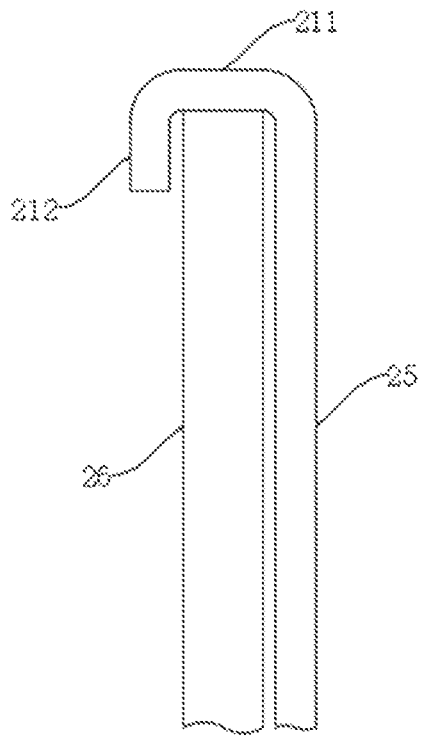
FIG. 9 is a schematic cross-sectional structure diagram of another embodiment of the slide rail mechanism for the foldable screen provided by the present application.
Figure 10:
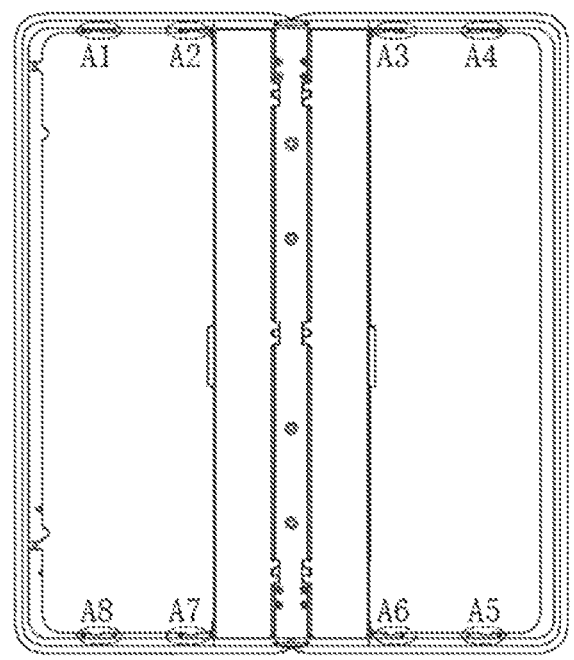
FIG. 10 is a schematic diagram showing an arrangement layout of another embodiment of eight slide rail mechanisms for the foldable screen on the bracket of the foldable mobile terminal.
Figure 11:
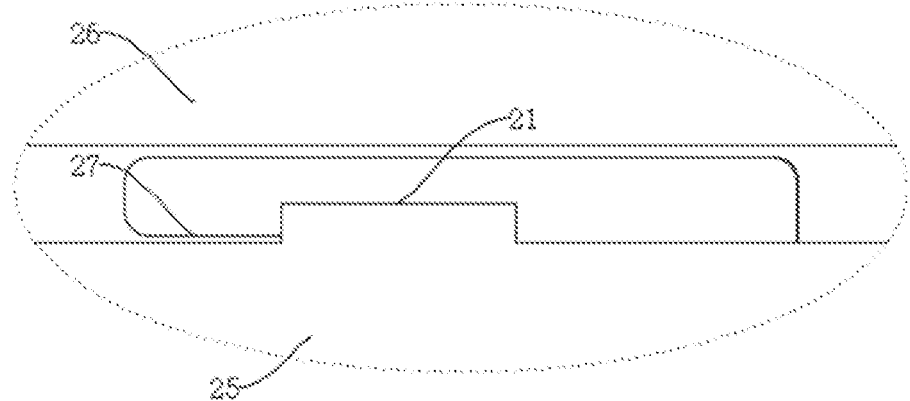
FIG. 11 is a partial enlarged schematic diagram of a position of a dotted line A1 in FIG. 10.
Figure 12:
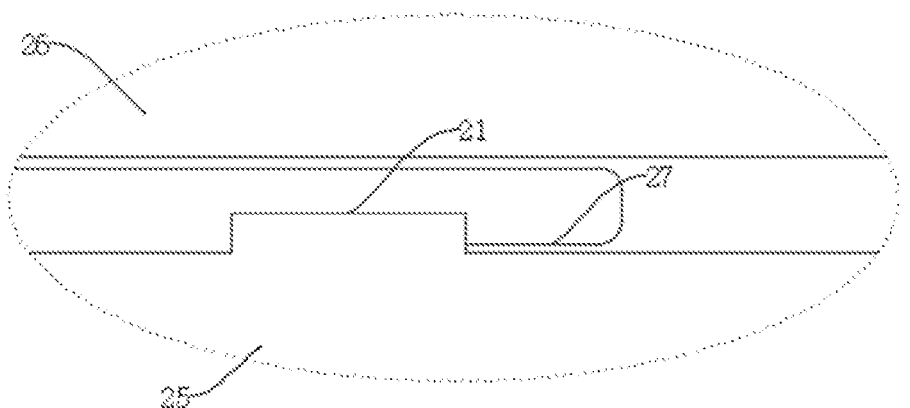
FIG. 12 is a partial enlarged schematic diagram of a position of a dotted line A3 in FIG. 10.

In some embodiments, as shown in FIGS. 8 and 9, the slide rail mechanism comprises a steel sheet 25, the sliding part, and the guide part 27, and the sliding part is fixed on the steel sheet 25. The "steel sheet 25" in this application can be understood as LCD steel sheets for supporting and fixing the foldable screen or other types of steel sheets for achieving similar functions. The guide part 27 is fixed on the bracket 26 of the foldable mobile terminal, and the sliding part cooperates with the guide part 27 and slides along the guide part 27. Under the guidance and support of the guide part 27, the sliding part slides smoothly when the foldable screen is unfolded or folded. During the smooth sliding of the sliding part, the steel sheet 25 slides smoothly at the same time, and the steel sheet 25 drives the foldable screen to slide smoothly, and the steel sheet 25 is configured to fix a foldable screen of the foldable mobile terminal. As shown in FIG. 10, the structure of the present application for implementing the slide rail mechanism is relatively simple. The sliding part is a bending piece extending from an edge of the steel sheet 25. In some specific embodiments, four corners of the steel sheet 25 can be extended and bent to form a sliding part. The guide part 27 is a stop edge on the bracket 26 of the foldable mobile terminal. The side of the bending piece rests on the stop edge and a slide rail with simpler structure and better reliability is formed by gathering the bending piece and the stop edge together. The bending piece comprises a first extension piece 211 and a second extension piece 212. The two opposite sides of the first extension piece 211 are respectively connected to the steel sheet 25 and the second extension piece 212. The first extension piece 211 and the steel sheet 25 are vertically arranged. The second extension piece 212 and the steel sheet 25 are horizontally arranged. The steel sheet 25, the first extension piece 211, and the second extension piece 212 together form a strip-shaped chute. The plate where the stop edge is located is embedded in in the chute and the inner side of the first extension piece 211 rests on the stop edge. The upper edge and the lower edge of the steel sheet 25 are symmetrically provided with sliding parts, and the number of sliding parts is an even number. As shown in FIG. 10, the slide rail mechanism provided in the present embodiment comprises two steel sheets 25. Of course, the present application can also use only one steel sheet matching the foldable screen according to actual conditions. As shown in FIGS. 10, 11, and 12, two steel sheets 25 are square in shape and the four corners are provided with sliding parts. FIGS. 11 and 12 are used to show different arrangements of the slide rail mechanisms on both sides. As shown in FIG. 10, for a foldable screen, this embodiment has eight slide rail mechanisms arranged at positions A1-A8. After substantial tests, it is shown that this method can ensure that the screen can slide very smoothly on the top of the case without affecting display effects of the screen.

Figure 7:
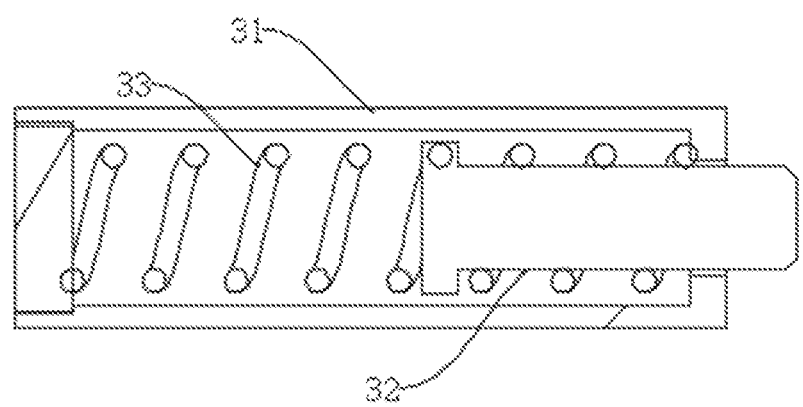
FIG. 7 is a schematic cross-sectional structure diagram of an embodiment of a booster structure for the foldable screen provided by the present application.

In some embodiments, the booster mechanism also comprises a spring, and the spring is in a compressed state under an action of a pulling force of the foldable screen fixed on the steel sheet (25) when the foldable screen of the foldable mobile terminal is in an unfolded state, and the spring releases a thrust that pushes the foldable screen to slide to both sides when the foldable screen of the foldable mobile terminal is restored to a folded state. As shown in FIGS. 6-7, the spring is a compression spring 33, the compression spring 33 is arranged in a cylindrical housing 31 with one end closed, the cylindrical housing 31 is fixed on the bracket 26 of the foldable mobile terminal, the compression spring 33 is connected to a head portion of the push rod 32 in the cylindrical housing 31, an end of a rod part of the push rod 32 protrudes from the cylindrical housing 31 and abuts on the steel sheet 25, and a diameter of a head portion of the push rod 32 is greater than a diameter of an opening of the cylindrical housing 31, which is more reliable. During the process of unfolding the foldable screen of the foldable mobile terminal, the rod portion of the push rod 32 is compressed and the compression spring 33 gradually accumulates energy. The compression spring 33 releases the accumulated energy and pushes the folded screen to slide in the corresponding direction when the foldable screen of the foldable mobile terminal is restored to the folded state, thereby better preventing the problem of wrinkles and delamination in the existing foldable screen.

Figure 13:
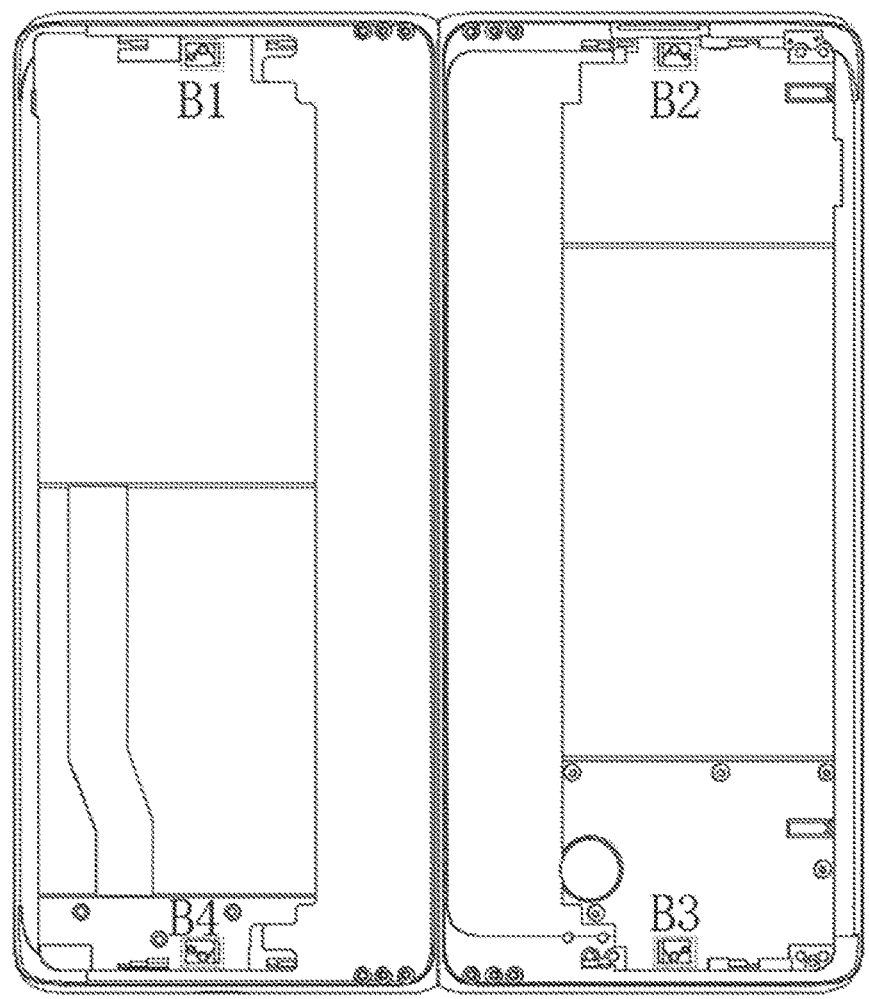
FIG. 13 is a schematic diagram showing an arrangement layout of another embodiment of four booster mechanisms for the foldable screen on the bracket of the foldable mobile terminal.
Figure 14:
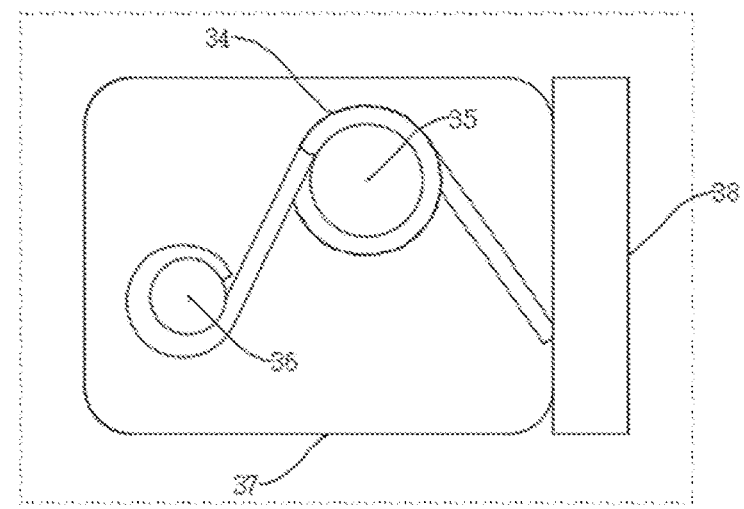
FIG. 14 is a partial enlarged schematic diagram of a position of a dotted line B1 in FIG. 13.
Figure 15:
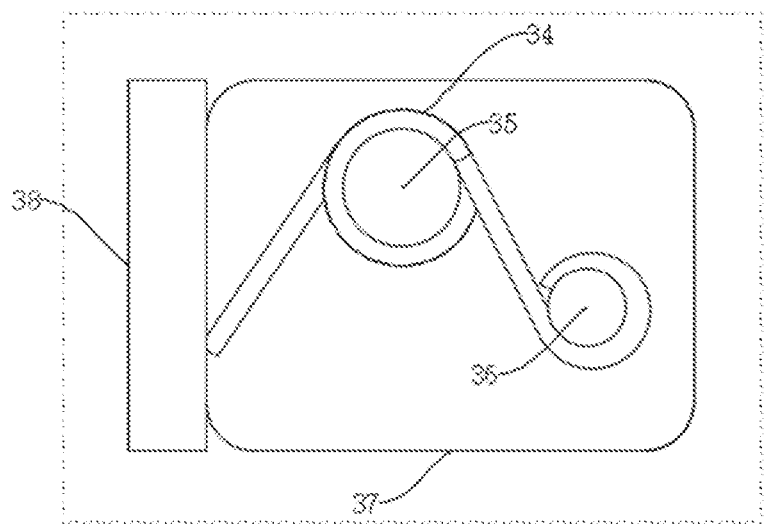
FIG. 15 is a partial enlarged schematic diagram of a position of a dotted line B2 in FIG. 13.
Figure 16:
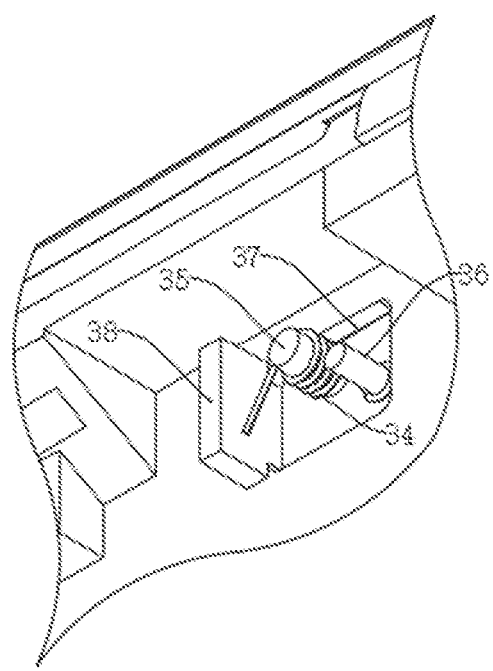
FIG. 16 is a schematic diagram of a three-dimensional structure of another embodiment of the booster mechanism for the foldable screen provided by the present application.

In some embodiments, the present application also provides a booster mechanism in other structural forms, and the booster mechanism also comprises a spring. One end of the spring is fixed on the steel sheet 25, and the other end of the spring abuts against the bracket 26 of the foldable mobile terminal (on a middle frame of the foldable mobile terminal). When the foldable screen of the foldable mobile terminal is in the unfolded state, the spring is in a compressed state under the action of the pulling force of the foldable screen fixed on the steel sheet 25, that is, the spring is gradually in a state of storaging energy during the unfolding process of the screen. When the foldable screen of the foldable mobile terminal is restored to the folded state, the spring releases the pushing force that pushes the foldable screen to slide to both sides, and the release of the energy accumulated by the spring compression pushes the two sides of the foldable screen to the two sides respectively, so the problem of wrinkles and delamination in the existing foldable screen is prevented, and the problem of wrinkles in the existing foldable screen that affects the display effect of the screen is completely prevented. The cross section of the foldable screen at the bend can be a "water-drop" shape in cooperation with the rotation shaft mechanism. As shown in FIGS. 14 and 15, a first fixing column 35 and a second fixing column 36 are fixed on the back of the steel sheet 25, and both the first fixing column 35 and the second fixing column 36 penetrate the bracket 26 of the foldable mobile terminal. The spring is a torsion spring 34, the main body of the torsion spring 34 is sleeved on the first fixing column 35, one end of the torsion spring 34 is fixed on the second fixing column 36, and the other end of the torsion spring 34 is pressed against the bracket 26 of the foldable mobile terminal. As shown in FIG. 16, a stopper 38 extending from the outer side of the bracket 26 of the foldable mobile terminal is provided beside a through hole 37, and the other end of the torsion spring 34 abuts against the side surface of the stopper 38. As shown in FIG. 13, for a foldable screen, the present embodiment has a total of four booster mechanisms arranged at the four positions of the bracket. In FIG. 13, there are four booster mechanisms at positions B1, B2, B3, and B4, that is, behind a foldable screen. Under the action of the symmetrically designed multiple booster mechanisms, the present application can smoothly reset the two ends of the foldable screen during the process of restoring the folded state of the foldable screen of the foldable mobile terminal, which significantly improves the usability of the foldable screen product. It better solves the problems of proneness to jamming and difficulty in restoring to the desired position on both sides of the existing foldable screen.

The present application further provides a foldable mobile terminal comprising any foldable screen assembly disclosed above or any rotation shaft mechanism for foldable screens disclosed above. The foldable mobile terminals may be a portable electronic product with a foldable screen, such as a smart phone, a smart watch, a smart bracelet, a tablet computer, a notebook computer, or a smart wearable device (such as a smart helmet and smart glasses).

Accordingly, although the present invention has been illustrated and described with respect to one or more implementations, equivalent alterations and modifications will occur to those skilled in the art based on a reading and understanding of the present disclosure and the accompanying drawings. The present invention comprises all such modifications and alterations and is limited only by the scope of the following claims.

What is claimed is:

1. A rotation shaft mechanism for a foldable screen, comprising a left arm and a right arm that are symmetrically arranged, wherein:
   the left arm is configured to secure a left support of a foldable mobile terminal, and the right arm is configured to secure a right support of the foldable mobile terminal;
   one end of the left arm is fixed with a left rotation shaft and one end of the right arm—is fixed with a right rotation shaft that is symmetrically arranged with the left rotation shaft;
   the left rotation shaft is connected with a left cam, the right rotation shaft is connected with a right cam, the left cam and the right cam—are both arranged on one side of a first limiting plate, and a second limiting plate—is arranged on the other side of the first limiting plate;
   a left gear, a right gear, and a transmission gear are arranged between the first limiting plate and the second limiting plate;
   one end of a central fixed shaft of the left gear penetrates into a first left limiting hole of the first limiting plate and is drivingly connected with the left cam, the other end of the central fixed shaft of the left gear penetrates into a second left limiting hole of the second limiting plate;
   one end of a central fixed shaft of the right gear penetrates into a first right limiting hole of the first limiting plate and is drivingly connected with the right cam, the other end of the central fixed shaft of the right gear penetrates into a second right limiting hole of the second limiting plate;
   the transmission gear is drivingly connected between the left gear and the right gear, and two ends of a central fixed shaft of the transmission gear respectively penetrate into a first middle limiting hole of the first limiting plate and a second middle limiting hole of the second limiting plate; and
   a left fan-shaped sliding slot is formed in an inner surface of the left arm, and a right fan-shaped sliding slot is formed in an inner surface of the right arm.

2. The rotation shaft mechanism for the foldable screen according to claim 1, wherein:
   a left connecting rod is provided in the left fan-shaped sliding slot, a left central shaft—is fixed to a circle center of the left fan-shaped sliding slot, wherein the left central shaft is rotatably connected to one end of the left connecting rod;
   a right connecting rod is provided in the right fan-shaped sliding slot, a right central shaft is fixed to a circle center of the right fan-shaped sliding slot, wherein the right central shaft is rotatably connected to one end of the right connecting rod.

3. The rotation shaft mechanism for the foldable screen according to claim 2, wherein the other end of the left connecting rod is rotatably connected to a left swing shaft, and the other end of the right connecting rod is rotatably connected with a right swing shaft.

4. The rotation shaft mechanism for the foldable screen according to claim 3, wherein:
   the left swing shaft is rotatably connected to a left side of a left lifting plate of the foldable mobile terminal;
   the right swing shaft is rotatably connected with a right side of a right lifting plate of the foldable mobile terminal; and
   the left lifting and right lifting plates are both arranged on a back of the foldable screen.

5. The rotation shaft mechanism for the foldable screen according to claim 4, wherein:
   an anchor block is provided at a middle of a bracket of the foldable mobile terminal, the second limiting plate is fixed to the anchor block, a left hinge and a right hinge are respectively fixed on both sides of the anchor block, a right side of the left lifting plate of the foldable mobile terminal is hinged to the anchor block through the left hinge, and a left side of the right lifting plate of the foldable mobile terminal is hinged to the anchor block through the right hinge; and
   a left containment hole corresponding to the second left limiting hole and a right containment hole corresponding to the second right limiting hole are formed on the anchor block, the other end of the central fixed shaft of the left gear sequentially penetrates the second left limiting hole and the left containment hole, and the other end of the central fixed shaft of the right gear sequentially penetrates the second right limiting hole and the right containment hole.

6. The rotation shaft mechanism for foldable screens according to claim 5, wherein:
   the left cam and the right cam are symmetrically arranged and have same structures, both comprising a first cam and a second cam that are secured to each other and arranged in an offset manner; and
   the two first cams are respectively connected to the left rotation shaft and the right rotation shaft; and
   the two second cams are respectively connected to the central fixed shaft of the left gear and the central fixed shaft of the right gear.

7. The rotation shaft mechanism for the foldable screen according to claim 4, wherein:
   the left cam and the right cam are symmetrically arranged and have same structures, both comprising a first cam and a second cam that are secured to each other and arranged in an offset manner; and
   the two first cams are respectively connected to the left rotation shaft and the right rotation shaft; and
   the two second cams are respectively connected to the central fixed shaft of the left gear and the central fixed shaft of the right gear.

8. The rotation shaft mechanism for the foldable screen according to claim 1, wherein:
the left cam and the right cam are symmetrically arranged and have same structures, both comprising a first cam and a second cam that are secured to each other and arranged in an offset manner; and
the two first cams are respectively connected to the left rotation shaft and the right rotation shaft; and
the two second cams are respectively connected to the central fixed shaft of the left gear—and the central fixed shaft of the right gear.

9. A foldable screen assembly, comprising a rotation shaft mechanism for a foldable screen, wherein:
the rotation shaft mechanism comprises a left arm and a right arm that are symmetrically arranged;
the left arm is configured to secure a left support of a foldable mobile terminal, and the right arm is configured to secure a right support of the foldable mobile terminal;
one end of the left arm is fixed with a left rotation shaft and one end of the right arm—is fixed with a right rotation shaft that is symmetrically arranged with the left rotation shaft;
the left rotation shaft is connected with a left cam, the right rotation shaft is connected with a right cam, the left cam and the right cam are both arranged on one side of a first limiting plate, and a second limiting plate—is arranged on the other side of the first limiting plate;
a left gear, a right gear, and a transmission gear are arranged between the first limiting plate and the second limiting plate;
one end of a central fixed shaft of the left gear penetrates into a first left limiting hole of the first limiting plate and is drivingly connected with the left cam, the other end of the central fixed shaft of the left gear penetrates into a second left limiting hole of the second limiting plate;
one end of a central fixed shaft of the right gear penetrates into a first right limiting hole of the first limiting plate and is drivingly connected with the right cam, the other end of the central fixed shaft of the right gear penetrates into a second right limiting hole of the second limiting plate;
the transmission gear is drivingly connected between the left gear and the right gear, and two ends of a central fixed shaft of the transmission gear respectively penetrate into a first middle limiting hole of the first limiting plate and a second middle limiting hole of the second limiting plate; and
a left fan-shaped sliding slot is formed in an inner surface of the left arm, and a right fan-shaped sliding slot is formed in an inner surface of the right arm.

10. The foldable screen assembly according to claim 9, wherein the foldable screen assembly further comprises a slide rail mechanism comprising a steel sheet, a sliding part and a guide part, the sliding part is fixed on the steel sheet, the guide part is fixed on the bracket of the foldable mobile terminal, the sliding part cooperates with the guide part and slides along the guide part, and the steel sheet is configured to fix the foldable screen of the foldable mobile terminal.

11. The foldable screen assembly according to claim 10, wherein:
the sliding part is a bending piece extending from an edge of the steel sheet, and a strip hole is formed in the bending piece; and
the guide part comprises a support block and a limiting member, the support block is fixed on the bracket of the foldable mobile terminal, the limiting member is fixed on a side of the support block, a rod portion of the limiting member passes through the strip hole and its end is secured to the support block, the strip hole is located between a head portion of the limiting member—and the support block, and a diameter of the head portion of the limiting member is greater than a width of the strip hole.

12. The foldable screen assembly according to claim 10, wherein the foldable screen assembly further comprises a booster mechanism, and the booster mechanism comprises:
a spring, and the spring is in a compressed state under an action of a pulling force of the foldable screen fixed on the steel sheet when the foldable screen of the foldable mobile terminal is in an unfolded state; and
the spring releases a thrust that pushes the foldable screen to slide to both sides when the foldable screen of the foldable mobile terminal is restored to a folded state.

13. The foldable screen assembly according to claim 9, wherein the foldable screen assembly further comprises a booster mechanism, and the booster mechanism comprises:
a spring, and the spring is in a compressed state under an action of a pulling force of the foldable screen fixed on the steel sheet when the foldable screen of the foldable mobile terminal is in an unfolded state; and
the spring releases a thrust that pushes the foldable screen to slide to both sides when the foldable screen of the foldable mobile terminal is restored to a folded state.

14. The foldable screen assembly according to claim 13, wherein:
the spring is a compression spring, the compression spring is arranged in a cylindrical housing with one end closed, the cylindrical housing is fixed on the bracket of the foldable mobile terminal, the compressional spring is connected to a head portion of a push rod in the cylindrical housing, an end of a rod part of the push rod protrudes from the cylindrical housing and abuts on the steel sheet, and a diameter of a head portion of the push rod is greater than a diameter of an opening of the cylindrical housing.

15. The foldable screen assembly according to claim 9, wherein:
a left connecting rod is provided in the left fan-shaped sliding slot, a left central shaft is fixed to a circle center of the left fan-shaped sliding slot, the left central shaft is rotatably connected to one end of the left connecting rod, and the other end of the left connecting rod is rotatably connected to a left swing shaft, and the left swing shaft is rotatably connected to a left side of a left lifting plate of the foldable mobile terminal;
a right connecting rod is provided in the right fan-shaped sliding slot, a right central shaft is fixed to a circle center of the right fan-shaped sliding slot, the right central shaft is rotatably connected to one end of the right connecting rod, the other end of the right connecting rod is rotatably connected with a right swing shaft, and the right swing shaft is rotatably connected with a right side of a right lifting plate of the foldable mobile terminal; and
the left lifting and right lifting plates are both arranged on the back of the foldable screen.

16. The foldable screen assembly according to claim 15, wherein:
an anchor block is provided at a middle of a bracket of the foldable mobile terminal, the second limiting plate is fixed to the anchor block, a left hinge and a right hinge are respectively fixed on both sides of the anchor block, a right side of the left lifting plate of the foldable mobile terminal is hinged to the anchor block through the left hinge, and a left side of the right lifting plate of the foldable mobile terminal is hinged to the anchor block through the right anchor; and a left containment hole corresponding to the second left limiting hole and a right containment hole corresponding to the second right limiting hole are formed on the anchor block, the other end of the central fixed shaft of the left gear sequentially penetrates the second left limiting hole and the left containment hole, and the other end of the central fixed shaft of the right gear sequentially penetrates the second right limiting hole and the right containment hole.

17. The foldable screen assembly according to claim 9, wherein:

the left cam and the right cam are symmetrically arranged and have same structures, both comprising a first cam and a second cam that are secured to each other and arranged in an offset manner; and the two first cams are respectively connected to the left rotation shaft and the right rotation shaft; and the two second cams are respectively connected to the central fixed shaft of the left gear and the central fixed shaft of the right gear.

18. A foldable mobile terminal, comprising a foldable screen assembly, wherein the foldable screen assembly comprises a rotation shaft mechanism for a foldable screen, wherein:

the rotation shaft mechanism comprises a left arm and a right arm that are symmetrically arranged;

the left arm is configured to secure a left support of a foldable mobile terminal, and the right arm is configured to secure a right support of the foldable mobile terminal;

one end of the left arm is fixed with a left rotation shaft and one end of the right arm—is fixed with a right rotation shaft that is symmetrically arranged with the left rotation shaft;

the left rotation shaft is connected with a left cam, the right rotation shaft is connected with a right cam, the left cam and the right cam are both arranged on one side of a first limiting plate, and a second limiting plate—is arranged on the other side of the first limiting plate;

a left gear, a right gear, and a transmission gear are arranged between the first limiting plate and the second limiting plate;

one end of a central fixed shaft of the left gear penetrates into a first left limiting hole of the first limiting plate and is drivingly connected with the left cam, the other end of the central fixed shaft of the left gear penetrates into a second left limiting hole of the second limiting plate;

one end of a central fixed shaft of the right gear penetrates into a first right limiting hole of the first limiting plate and is drivingly connected with the right cam, the other end of the central fixed shaft of the right gear penetrates into a second right limiting hole of the second limiting plate;

the transmission gear is drivingly connected between the left gear and the right gear, and two ends of a central fixed shaft of the transmission gear respectively penetrate into a first middle limiting hole of the first limiting plate and a second middle limiting hole of the second limiting plate; and a left fan-shaped sliding slot is formed in an inner surface of the left arm, and a right fan-shaped sliding slot is formed in an inner surface of the right arm.

19. The foldable mobile terminal according to claim 18, wherein the foldable screen assembly further comprises a slide rail mechanism comprising a steel sheet, a sliding part, and a guide part, the sliding part is fixed on the steel sheet, the guide part is fixed on the bracket of the foldable mobile terminal, the sliding part cooperates with the guide part and slides along the guide part, and the steel sheet is configured to fix the foldable screen of the foldable mobile terminal.

20. The foldable mobile terminal according to claim 18, wherein the foldable screen assembly further comprises a booster mechanism, and the booster mechanism comprises:

a spring, and the spring is in a compressed state under an action of a pulling force of the foldable screen fixed on the steel sheet when the foldable screen of the foldable mobile terminal is in an unfolded state; and the spring releases a thrust that pushes the foldable screen to slide to both sides when the foldable screen of the foldable mobile terminal is restored to a folded state.

* * * * *